(12) United States Patent
Plowman

(10) Patent No.: US 9,870,752 B2
(45) Date of Patent: *Jan. 16, 2018

(54) DISPLAY DIMMING IN RESPONSE TO USER

(71) Applicant: INTEL CORPORATION, Santa Clara, CA (US)

(72) Inventor: Tim Plowman, Berkeley, CA (US)

(73) Assignee: INTEL CORPORATION, Santa Clara, CA (US)

( * ) Notice: Subject to any disclaimer, the term of this patent is extended or adjusted under 35 U.S.C. 154(b) by 452 days.

This patent is subject to a terminal disclaimer.

(21) Appl. No.: 14/145,781

(22) Filed: Dec. 31, 2013

(65) Prior Publication Data

US 2014/0145940 A1     May 29, 2014

Related U.S. Application Data

(63) Continuation of application No. 13/976,764, filed as application No. PCT/US2011/067491 on Dec. 28, 2011.

(51) Int. Cl.
G09G 5/10       (2006.01)
G06F 1/32       (2006.01)
G09G 5/00       (2006.01)

(52) U.S. Cl.
CPC ............ G09G 5/10 (2013.01); G06F 1/3231 (2013.01); G06F 1/3265 (2013.01); G09G 5/00 (2013.01); G09G 2320/0626 (2013.01); G09G 2356/00 (2013.01); Y02B 60/1242 (2013.01); Y02B 60/1289 (2013.01)

(58) Field of Classification Search
CPC ...... G06F 3/041; G06F 1/3215; G06F 1/3265; G06F 1/3231; G09G 5/10; G09G 5/00

USPC .......................................................... 345/156
See application file for complete search history.

(56) References Cited

U.S. PATENT DOCUMENTS

| 9,124,685 B2* | 9/2015 | Kulas ..................... G06F 3/041 |
| 2002/0141614 A1 | 10/2002 | Lin |
| 2002/0151283 A1 | 10/2002 | Pallakoff |
| 2006/0227125 A1 | 10/2006 | Wong et al. |
| 2007/0162922 A1 | 7/2007 | Park |
| 2008/0131109 A1 | 6/2008 | Honjo et al. |
| 2009/0315827 A1 | 12/2009 | Elvesjo et al. |
| 2010/0207877 A1 | 8/2010 | Woodard |
| 2010/0238344 A1 | 9/2010 | Tsai |

(Continued)

FOREIGN PATENT DOCUMENTS

| JP | 2004-534261 A | 11/2004 |
| JP | 2008-109310 A | 5/2008 |

(Continued)

OTHER PUBLICATIONS

Office Action Received for Japanese Patent Application No. 2014-547176, dated Apr. 28, 2015, 1 Pages of Japanese Office Action and 3 Pages of English Translation.

(Continued)

*Primary Examiner* — Fred Tzeng

(57) ABSTRACT

In some embodiments a detector is to detect a body of a user. A controller is to determine an area of focus of the user in response to the detector, and to dim a portion of a display that is not in the area of focus. Other embodiments are described and claimed.

78 Claims, 2 Drawing Sheets

(56) References Cited

U.S. PATENT DOCUMENTS

| | | | |
|---|---|---|---|
| 2011/0273369 A1 | 11/2011 | Imai et al. | |
| 2012/0032894 A1* | 2/2012 | Parivar | G06F 1/3215 345/173 |
| 2012/0188355 A1* | 7/2012 | Omi | A61B 5/0077 348/78 |
| 2012/0288139 A1* | 11/2012 | Singhar | G06F 1/3265 382/103 |
| 2013/0021336 A1 | 1/2013 | Tsukagoshi et al. | |
| 2013/0190045 A1* | 7/2013 | Kulas | G06F 3/041 455/556.1 |
| 2013/0249410 A1 | 9/2013 | Thompson | |
| 2014/0139542 A1 | 5/2014 | Plowman et al. | |
| 2014/0204016 A1 | 7/2014 | Plowman et al. | |

FOREIGN PATENT DOCUMENTS

| | | |
|---|---|---|
| JP | 2009-237210 A | 10/2009 |
| JP | 2011-070686 A | 4/2011 |
| WO | 2013/100937 A1 | 7/2013 |

OTHER PUBLICATIONS

International Search Report and Written Opinion received for PCT Patent Application No. PCT/US2011/067491, dated Aug. 30, 2012, 10 pages.

International Preliminary Report on Patentability and Written Opinion received for PCT Patent Application No. PCT/US2011/067491 dated Jul. 10, 2014, 7 pages.

* cited by examiner

DISPLAY DIMMING IN RESPONSE TO USER

CROSS-REFERENCE TO RELATED APPLICATION

This application is a continuation of U.S. patent application Ser. No. 13/976,764, filed on Jun. 27, 2013, and entitled "Display Dimming in Response to User," which is a 371 of international application PCT/US11/67491, filed on Dec. 28, 2011, the contents of which are hereby incorporated by reference as though fully set forth herein.

TECHNICAL FIELD

The inventions generally relate to display dimming in response to a user.

BACKGROUND

Current power management implementations are not context aware. Mobile devices, for example, typically have power modes that are only responsive to being touched or closed. A user will experience a complete loss of interaction with any application, work, or content with which the user is interfacing. Today's power management techniques are not otherwise aware of context in any meaningful way. It is not responsive to what the user is doing or how the user is working, creating, consuming, etc. Power management is typically an "all or nothing" arrangement, with a power management state corresponding to dimming of the display screen, for example.

BRIEF DESCRIPTION OF THE DRAWINGS

The inventions will be understood more fully from the detailed description given below and from the accompanying drawings of some embodiments of the inventions which, however, should not be taken to limit the inventions to the specific embodiments described, but are for explanation and understanding only.

DETAILED DESCRIPTION

Some embodiments of the inventions relate to display dimming in response to a user's body.

In some embodiments, a body of a user is detected, an area of focus of the user is determined in response to the detecting, and a portion of a display that is not in the area of focus is dimmed.

In some embodiments a detector is to detect a body of a user. A controller is to determine an area of focus of the user in response to the detector, and to dim a portion of a display that is not in the area of focus.

Figure 1:
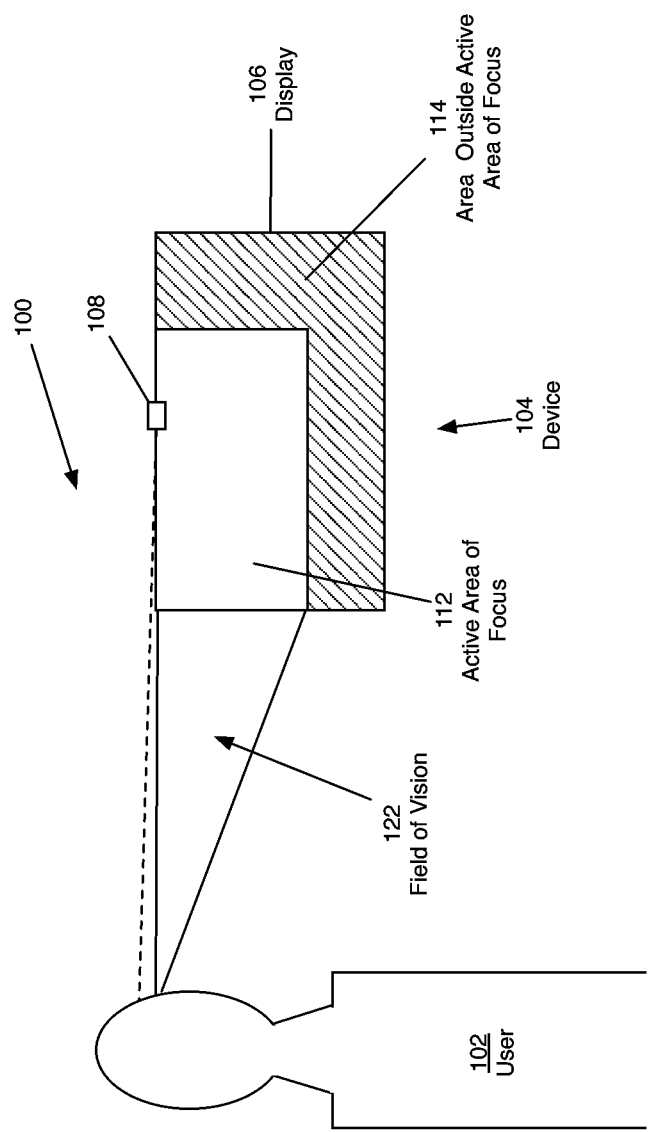
FIG. 1 illustrates a system according to some embodiments of the inventions.

FIG. 1 illustrates a system 100 according to some embodiments. In some embodiments system 100 includes a user 102 and a device 104 such as an electronic device. In some embodiments, device 104 is one or more of a computer, a desktop computer, a personal computer, a mobile phone, a tablet, a laptop, a mobile device, a mobile internet device, a music player, etc.

In some embodiments, device 104 includes a display 106 and a camera 108. In some embodiments, display 106 is a display screen or a device screen, etc. In some embodiments, camera 108 is a still camera, a video camera, a web camera, etc. In some embodiments, camera 108 is coupled to and/or part of the display 106 of the device 104.

In some embodiments, display 104 includes an area 112 of active user focus and an area 114 that is not actively viewed by the user 102. For example, when user 102 is working on a particular application appearing on the display 104 the user's attention is focused on area 112 and the user is not paying attention to anything that is displayed in area 114.

In some embodiments, camera 108 monitors user 102. Specifically, in some embodiments, camera 108 monitors a particular body area of the user such as the head or the eyes of the user. Based on the monitoring of user 102 by the camera 108, it may be determined where the user 102 is gazing into a field of vision 122.

In some embodiments, the gaze of user 102 is monitored in order to perform power management. In some embodiments, the field of vision 122 of user 102 can be determined in response to the monitoring of the camera in order to help determine the area 112 of active focus that the user is currently focusing on within the display 106. Once the area 106 of focus has been determined, power management is implemented according to some embodiments. For example, in some embodiments, area 114 of display 106 that is not being actively viewed by the user is dimmed, completely blackened, or otherwise changed in order to manage power use by the device 104.

Figure 2:
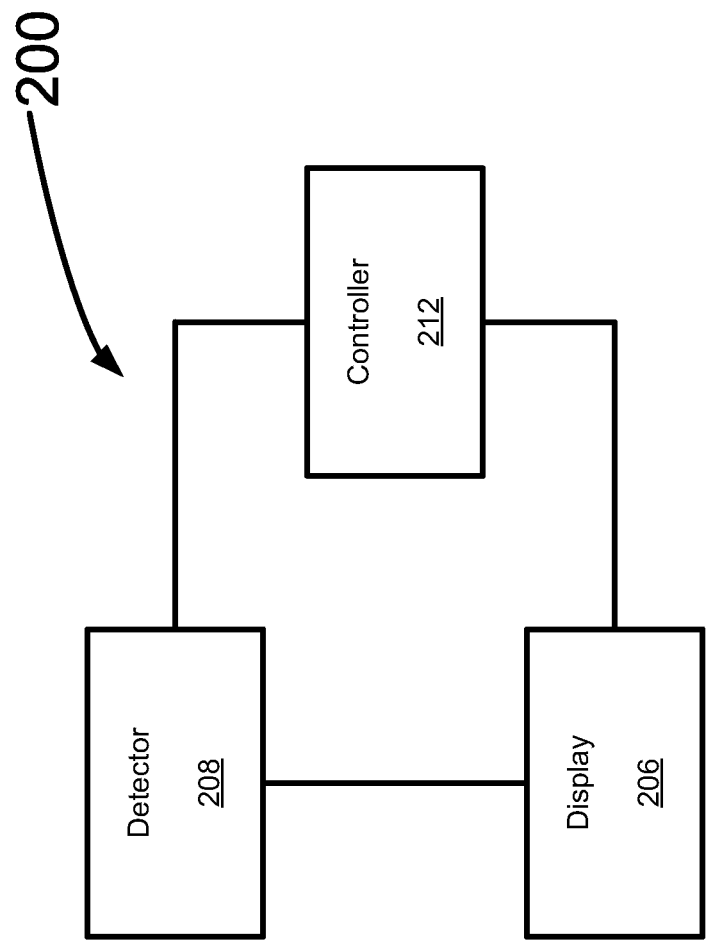
FIG. 2 illustrates a system according to some embodiments of the inventions.

FIG. 2 illustrates a system 200 according to some embodiments. In some embodiments system 200 includes a display 206, a detector 208, and a controller 212. In some embodiments, display is a display that is the same as or similar to display 106 in FIG. 1. In some embodiments, detector 208 is a detector that detects a body of a user (for example, to determine an area of focus of the user). In some embodiments, detector 208 is a detector that detects a physical feature of a body of a user. For example, in some embodiments, detector 208 is a detector that detects a positioning, orientation, or movement of a user's head, face, eye, eyes, ear, ears, mouth, nose, shoulder, shoulders, and/or body, etc.

In some embodiments, detector 208 is an eye tracker. In some embodiments, detector 208 is an eye tracker that detects movement of one or both eyes of a user. In some embodiments, detector 208 is a camera (for example, a camera that is the same as or similar to camera 108 in FIG. 1). In some embodiments, controller 212 is a processor.

In some embodiments, detector 208 detects a user's gaze. In response to the detected gaze, controller 212 determines if the user's gaze is directed toward a specific area of the display 206 for a sustained period of time, for example. In some embodiments, controller 212 calculates the specific area of the display 206 corresponding to the user's gaze (for example, area 112 in FIG. 1 according to some embodiments). In some embodiments, controller 212 dims, blackens, or otherwise changes an area of display 206 that is not in the area of the user's gaze (for example, to save power and/or to save battery power). In some embodiments, only a portion of display 206 remains illuminated. In some embodiments, controller 212 and display 206 use a visual marker to dim, blacken or otherwise change the area of display 206 that is not in the area of the user's gaze.

In some embodiments, if a user's gaze changes (for example, by a user moving their eyes toward a different portion of the display 206), the system 200 reawakens, for example, to a full screen display/illumination mode. In some embodiments, when this occurs, an outline of the previous area of the user's gaze (that is, the area where the user's attention was previously focused) is provided using controller 212 and display 206. In some embodiments, this outline area slowly fades away as the gaze detection of detector 208 and controller 212 register eye movement outside the last area of major focus by the user.

In some embodiments, power is saved by dimming (for example, partially dimming, fully dimming, and/or blackening) a portion of the display, even if it is only a small portion of the display. This is particularly helpful in a mobile device that is using battery power. By dimming a portion of the display, it is easier for the user's eyes to focus on the task at hand rather than being distracted by peripheral visual noise. Additionally, according to some embodiments, power management is context aware since gaze detection across some or all areas of the display screen may be only slightly dimmed instead of entirely dimming the screen. According to some embodiments, the user sets preferences to select complete or shaded use of this tool (for example, complete dimming or slight dimming, a user adjustable amount of dimming, etc).

Although some embodiments have been described herein as being implemented in a certain way, according to some embodiments these particular implementations may not be required.

Although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, the interfaces that transmit and/or receive signals, etc.), and others.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Although flow diagrams and/or state diagrams may have been used herein to describe embodiments, the inventions are not limited to those diagrams or to corresponding descriptions herein. For example, flow need not move through each illustrated box or state or in exactly the same order as illustrated and described herein.

The inventions are not restricted to the particular details listed herein. Indeed, those skilled in the art having the benefit of this disclosure will appreciate that many other variations from the foregoing description and drawings may be made within the scope of the present inventions. Accordingly, it is the following claims including any amendments thereto that define the scope of the inventions.

What is claimed is:

1. A method comprising:
   detecting at least one feature of a user;
   not dimming a first portion of a display based on the detecting; and
   not illuminating a second portion of the display based on the detecting.

2. The method of claim 1, wherein the at least one feature of the user is detected based on whether one or more eyes of the user appear to be looking at the display.

3. The method of claim 2, wherein the detecting further detects at least one of a positioning, orientation, or movement of the user.

4. The method of claim 1, wherein the at least one feature of the user is detected based on at least one of a head, eye, eyes, face, ear, ears, mouth, nose, shoulder, or shoulders of the user.

5. The method of claim 4, wherein the detecting further detects at least one of a positioning, orientation, or movement of the user.

6. The method of claim 1, wherein the detecting further detects at least one of a positioning, orientation, or movement of the user.

7. The method of claim 1, wherein the detecting further detects an image of the user.

8. The method of claim 1, wherein the at least one feature of the user corresponds to a gaze of the user.

9. The method of claim 1, wherein the detecting is implemented using a camera.

10. The method of claim 1, further comprising:
determining a change in an area of focus of the user; and
undimming at least a part of the first portion of the display in response to the determining of the change in the area of focus of the user.

11. The method of claim 10, further comprising:
providing an outline on the display in the area of focus of the user; and
fading the outline in response to the determining of the change in the area of focus of the user.

12. The method of claim 1, wherein the display is included in one or more of a computer, a desktop computer, a personal computer, a mobile phone, a tablet, a laptop, a mobile device, a mobile internet device, a music player.

13. The method of claim 1, wherein the display is included in a mobile phone.

14. The method of claim 1, wherein the display is included in a tablet.

15. The method of claim 1, wherein the display is a display screen.

16. An apparatus comprising:
a display;
a camera;
a detector to detect at least one feature of a user in response to the camera; and
a controller to not dim a first portion of a display and not illuminate a second portion of the display based on the detected at least one feature of the user.

17. The apparatus of claim 16, the detector to detect the at least one feature of the user based on whether one or more eyes of the user appear to be looking at the display.

18. The apparatus of claim 17, the detector further to detect at least one of a positioning, orientation, or movement of the user.

19. The apparatus of claim 16, the detector to detect the at least one feature of the user based on at least one of a head, eye, eyes, face, ear, ears, mouth, nose, shoulder, or shoulders of the user.

20. The apparatus of claim 19, the detector further to detect at least one of a positioning, orientation, or movement of the user.

21. The apparatus of claim 16, the detector further to detect at least one of a positioning, orientation, or movement of the user.

22. The apparatus of claim 16, the detector to detect an image of the user.

23. The apparatus of claim 16, wherein the at least one feature of the user corresponds to a gaze of the user.

24. The apparatus of claim 16, the camera to implement the detecting.

25. The apparatus of claim 16, the controller to determine a change in an area of focus of the user, and to undim the first portion of the display based on determining the change in the area of focus of the user.

26. The apparatus of claim 25, the controller to provide an outline on the display in the area of focus of the user, and to fade the outline in response to the determining of the change in the area of focus of the user.

27. The apparatus of claim 16, wherein the apparatus is one or more of a computer, a desktop computer, a personal computer, a mobile phone, a tablet, a laptop, a mobile device, a mobile internet device, a music player.

28. The apparatus of claim 16, wherein the apparatus is a mobile phone.

29. The apparatus of claim 16, wherein the apparatus is a tablet.

30. The apparatus of claim 16, wherein the display is a display screen.

31. At least one computer-readable medium comprising one or more instructions that when executed on a computing device cause the computing device to:
detect at least one feature of a user;
not dim a first portion of a display detected at least one feature; and
not illuminate a second portion of the display based on the detected at least one feature of the user.

32. The at least one computer readable medium of claim 31, the at least one computer readable medium further to detect the at least one feature of the user based on whether one or more eyes of the user appear to be looking at the display.

33. The at least one computer readable medium of claim 32, the at least one computer readable medium further to detect at least one of a positioning, orientation, or movement of the user.

34. The at least one computer readable medium of claim 31, the at least one computer readable medium further to detect at least one of a head, face, ear, ears, mouth, nose, shoulder, or shoulders of the user.

35. The at least one computer readable medium of claim 31, the at least one computer readable medium further to detect at least one of a positioning, orientation, or movement of the user.

36. The at least one computer readable medium of claim 31, the at least one computer readable medium further to detect at least one of a positioning, orientation, or movement of the user.

37. The at least one computer readable medium of claim 31, the at least one computer readable medium further to detect an image of the user.

38. The at least one computer readable medium of claim 31, the at least one computer readable medium further to detect a gaze of the user.

39. The at least one computer readable medium of claim 31, the at least one computer readable medium further to detect using a camera.

40. The at least one computer readable medium of claim 31, the at least one computer readable medium further to determine a change in an area of focus of the user, and to undim at least a part of the first portion of the display in response to the change in the area of focus of the user.

41. The at least one computer readable medium of claim 40, the at least one computer readable medium further to provide an outline on the display in the area of focus of the user, and to fade the outline in response to the change in the area of focus of the user.

42. The at least one computer readable medium of claim 31, wherein the display is included in one or more of a computer, a desktop computer, a personal computer, a mobile phone, a tablet, a laptop, a mobile device, a mobile internet device, a music player.

43. The at least one computer readable medium of claim 31, wherein the display is included in a mobile phone.

44. The at least one computer readable medium of claim 31, wherein the display is a tablet.

45. The at least one computer readable medium of claim 31, wherein the display is a display screen.

46. A method comprising:
  detecting at least one feature of a user;
  preventing a first portion of a display from dimming based on the detected at least one feature; and
  preventing a second portion of the display from illuminating based on the detected at least one feature.

47. The method of claim 46, wherein the at least one feature of the user is at least one facial feature of the user.

48. The method of claim 46, wherein the at least one feature of the user is detected based on whether one or more eyes of the user appear to be looking at the display.

49. The method of claim 46, wherein the at least one feature of the user is detected based on whether one or more eyes of the user appear to be looking at the first portion of the display.

50. The method of claim 46, wherein the at least one feature of the user is detected based on at least one of a head, eye, eyes, face, ear, ears, mouth, nose, shoulder, or shoulders of the user.

51. The method of claim 46, wherein the detecting further detects at least one of a positioning, orientation, or movement of the user.

52. The method of claim 46, wherein the at least one feature of the user corresponds to a gaze of the user.

53. The method of claim 46, wherein the display is included in one or more of a computer, a desktop computer, a personal computer, a mobile phone, a tablet, a laptop, a mobile device, a mobile internet device, a music player.

54. The method of claim 46, wherein the display is included in a mobile phone.

55. The method of claim 46, wherein the display is included in a tablet.

56. The method of claim 46, wherein the display is a display screen.

57. An apparatus comprising:
  a display;
  a camera;
  a detector to detect at least one feature of a user in response to the camera; and
  a controller to prevent at least one portion of the display from dimming in response to the detector;
  a controller to prevent a first portion of a display from dimming and prevent a second portion of the display from illuminating based on the detected at least one feature of the user.

58. The apparatus of claim 57, wherein the at least one feature of the user is at least one facial feature of the user.

59. The apparatus of claim 57, the detector to detect the at least one feature of the user based on whether one or more eyes of the user appear to be looking at the display.

60. The apparatus of claim 57, the detector to detect the at least one feature of the user based on at least one of a head, eye, eyes, face, ear, ears, mouth, nose, shoulder, or shoulders of the user.

61. The apparatus of claim 57, the detector further to detect at least one of a positioning, orientation, or movement of the user.

62. The apparatus of claim 57, wherein the at least one feature of the user corresponds to a gaze of the user.

63. The apparatus of claim 57, the camera to implement the detecting.

64. The apparatus of claim 57, wherein the apparatus is one or more of a computer, a desktop computer, a personal computer, a mobile phone, a tablet, a laptop, a mobile device, a mobile internet device, a music player.

65. The apparatus of claim 57, wherein the apparatus is a mobile phone.

66. The apparatus of claim 57, wherein the apparatus is a tablet.

67. The apparatus of claim 57, wherein the display is a display screen.

68. At least one computer-readable medium comprising one or more instructions that when executed on a computing device cause the computing device to:
  detect at least one feature of a user;
  prevent a first portion of a display from dimming based on the detected at least one feature; and
  prevent a second portion of the display from illuminating based on the detected at least one feature.

69. The at least one computer readable medium of claim 68, wherein the at least one feature of the user is at least one facial feature of the user.

70. The at least one computer readable medium of claim 68, the at least one computer readable medium further to detect the at least one feature of the user based on whether one or more eyes of the user appear to be looking at the display.

71. The at least one computer readable medium of claim 68, the at least one computer readable medium further to detect the at least one feature of the user based on whether one or more eyes of the user appear to be looking at the first portion of the display.

72. The at least one computer readable medium of claim 68, the at least one computer readable medium further to detect the at least one feature of the user based on at least one of a head, eye, eyes, face, ear, ears, mouth, nose, shoulder, or shoulders of the user.

73. The at least one computer readable medium of claim 68, the at least one computer readable medium further to detect at least one of a positioning, orientation, or movement of the user.

74. The at least one computer readable medium of claim 68, wherein the at least one feature of the user corresponds to a gaze of the user.

75. The at least one computer readable medium of claim 68, wherein the display is included in one or more of a computer, a desktop computer, a personal computer, a mobile phone, a tablet, a laptop, a mobile device, a mobile internet device, a music player.

76. The at least one computer readable medium of claim 68, wherein the display is included in a mobile phone.

77. The at least one computer readable medium of claim 68, wherein the display is included in a tablet.

78. The at least one computer readable medium of claim 68, wherein the display is a display screen.

* * * * *